United States Patent [19]

Clifford et al.

[11] Patent Number: 5,106,464
[45] Date of Patent: Apr. 21, 1992

[54] DECREASING THE CONCENTRATION OF HYDROXYL IONS IN AQUEOUS ALKALINE PEROXIDE SOLUTIONS

[75] Inventors: Arthur L. Clifford, Everett; Derek J. Rogers, Kingston, both of Canada

[73] Assignee: H-D Tech Inc., Sarnia, Canada

[21] Appl. No.: 510,342

[22] Filed: Apr. 16, 1990

[51] Int. Cl.$^5$ .................................... C25B 1/00
[52] U.S. Cl. .................................... 204/83; 204/98; 204/182.4; 204/301; 210/321.71
[58] Field of Search ............ 204/83, 84, 82, 98, 204/182.4, 301; 210/321.71, 321.6

[56] References Cited

U.S. PATENT DOCUMENTS

| | | | |
|---|---|---|---|
| 3,165,415 | 6/1991 | Kilburn et al. | 204/182.4 |
| 4,319,973 | 3/1982 | Porta et al. | 204/83 |
| 4,350,575 | 9/1982 | Porta et al. | 204/84 |
| 4,357,217 | 11/1982 | Kuehn et al. | 204/84 |
| 4,384,931 | 5/1983 | Jasinski et al. | 204/84 |
| 4,758,317 | 7/1988 | Chiang | 204/84 |
| 4,830,720 | 5/1989 | Harada et al. | 204/131 |
| 4,891,107 | 1/1990 | Dong et al. | 204/296 |

OTHER PUBLICATIONS

Takenaka, Hiroyasu et al., Denki Kagaku oyobi Kogyo Butsuri Kagaku, 57(11), 1073-1080 (1989), Chemical Abstracts 112: 27238b.

Primary Examiner—John Niebling
Assistant Examiner—Arun S. Phasge
Attorney, Agent, or Firm—Andrew E. Pierce

[57] ABSTRACT

Novel methods of decreasing the concentration of hydroxyl ions in an electrochemically generated alkaline peroxide aqueous solution consisting of partial neutralization of a stabilized solution of alkaline hydrogen peroxide, electrodialysis, and dialysis of an aqueous solution of alkaline hydrogen peroxide. The methods of the invention can be performed at ambient temperature and pressure.

13 Claims, 1 Drawing Sheet

DECREASING THE CONCENTRATION OF HYDROXYL IONS IN AQUEOUS ALKALINE PEROXIDE SOLUTIONS

BACKGROUND OF THE INVENTION

1. Field of the Invention

This invention relates to methods and apparatus for decreasing the concentration of hydroxyl ions in an alkaline hydrogen peroxide aqueous solution.

2. Description of the Prior Art

Peroxides are used in the bleaching of both high-yield and chemical pulps. When used under relatively mild conditions of 35°-55° C., peroxide is an effective lignin-preserving bleaching agent, improving the brightness of groundwood and other highly lignified pulps without significant yield loss. The pulp and paper industry commonly requires that peroxide bleach liquor compositions consist of one mole of total base to one mole of perhydroxyl ion, or a 1:1 mole ratio. This ratio is most usually expressed in the pulp and paper industry as a weight ratio of total alkalinity (expressed as sodium hydroxide) to perhydroxyl ion (expressed as hydrogen peroxide). Therefore, a 1:1 mole ratio would correspond to a 1.18:1 weight ratio.

Aqueous alkaline solutions of perhydroxyl ion can be generated electrochemically, for example, by the method of U.S. Pat. No. 4,693,794 or by electrochemical cells as disclosed in U.S. Pat. No. 4,406,758 which can utilize electrodes as described in U.S. Pat. No. 4,481,303. Other patents disclosing electrolytic cells for producing hydrogen peroxide are U.S. 4,758,317; 4,384,931; and 4,357,217. All these methods of producing an aqueous alkaline solution of a perhydroxyl ion involve a two electron reduction of oxygen at the cell cathode to effect the production of perhydroxyl (i.e., hydroperoxide) ions and hydroxyl ions according to the reaction:

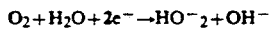

$$O_2 + H_2O + 2e^- \rightarrow HO_2^- + OH^-$$

The electrolyte utilized in such electrochemical cells can be an aqueous alkali metal halide or preferably an aqueous alkali metal hydroxide. The electrolyte can be either supplied directly to the catholyte of the cell together with oxygen or through controlled flow across a cell separator. The flow is controlled by a net hydraulic pressure applied to the cell anode face of the cell separator. As can be seen from the above reaction, one mole of hydroxyl ion is produced with every mole of perhydroxyl ion. In the absence of any anion selectivity of the cell membrane or separator, and neglecting any decomposition of the peroxide, electrolytic losses of perhydroxyl ion or hydroxyl ion, the best molar ratio of hydroxyl ion to perhydroxyl ion is about 1:1. If, for example, an aqueous solution of sodium hydroxide is used as the electrolyte, an equimolar aqueous solution of sodium hydroxide and sodium hydroperoxide is obtained in the electrolytic cell. Since sodium hydroperoxide is a base, it contributes to the total alkalinity of the solution mixture. Therefore, a mixture of 1 mole of sodium hydroxide and 1 mole of sodium hydroperoxide produces a solution containing 2 moles of base when the total alkalinity is expressed as sodium hydroxide alone. Thus, the best molar ratio of total base to hydrogen peroxide which is obtainable utilizing an electrolytic cell to produce hydrogen peroxide is a molar ratio of about 2:1.

A 2:1 mole ratio of sodium hydroxide to hydrogen peroxide produced by an electrochemical cell process corresponds to a weight ratio of about 2.35:1 of sodium hydroxide to hydrogen peroxide. Bleaching solutions having this ratio of base to hydrogen peroxide find some use in the pulp and paper industry. By far the majority of the applications for hydrogen peroxide in the pulp and paper industry require much lower weight ratios, namely, about 0.8 to about 1.1:1 of base to hydrogen peroxide. In order for an electrolytic cell process for the production of hydrogen peroxide to satisfy the requirements of the pulp and paper industry, a method of removing excess sodium hydroxide from the electrolytic cell product would be desirable.

In Japanese patent disclosure 61-284591, Dec. 15, 1986 entitled "Production Method for Hydrogen Peroxide", there is disclosed that hydrogen peroxide can be separated by dialysis from an aqueous solution of an alkali metal hydroxide using a monovalent anion selective exchange membrane. No details of the anion exchange membrane or other details of the dialysis process for separation of the alkali metal hydroxide are disclosed in this reference.

The solvated ion diameter of the perhydroxyl ion has been suggested, by Appleby and Marie in "Electrochimica Acta", 24, 195-202, to be in the range of 6 Angstroms, or $6 \times 10^{-4}$ microns. The diameter of a solvated hydroxyl ion, accordingly, must be somewhat less, if indeed, it behaves as a solvated ion in the absence of a potential gradient. The difference between the sizes of the perhydroxyl and the hydroxyl ion would appear to be too small to allow separation from each other efficiently by the class of membranes termed microporous. That is, no separation would occur unless some separation driving force other than a concentration gradient serves to modify the ion transport rate through the membrane to increase the rate over that which would be achieved by diffusion of the ions alone.

Ion exchange membranes exist which separate ion species on the basis of differences in the amount of charge, for instance, monovalent hydroxyl ions can be separated from divalent sulfate ions. Since the perhydroxyl and the hydroxyl ion are both monovalent, such membranes which discriminate between ions on the basis of charge would be of little value in separating the perhydroxyl ion from the hydroxyl ion. Other known ion exchange membranes, as exemplified by the permselective membranes sold under the tradename NAFION ® by DuPont or under the tradename FLEMION by Asahi are characterized as strong ion exchange membranes. These membranes were developed for chloralkali electrolytic cells. They are characterized as being ion permeable instead of liquid or hydraulically permeable. Being strong ion exchange membranes, these membranes were developed to permit positive or negative ion transport while blocking the transport of oppositely charged ions. Since the perhydroxyl ion and the hydroxyl ion have the same negative charge, these membranes would not discriminate between these two negatively charged ions so as to permit one ion to pass through the membrane, yet block the other ion from passage. Therefore, no separation of hydroxyl ion from perhydroxyl ion would be expected to occur utilizing these prior art ion exchange membranes.

Another type of permselective membrane is characterized as a weak ion exchange membrane. One such membrane is described in D'Agostino et al U.S. Pat. No. 4,230,549 assigned to RAI Research Corporation, entitled "Separator Membranes for Electrochemical Cells". This type of weak ion exchange permselective membrane is also described by RAI Research Corporation as a base diffusion dialysis membrane capable of separating a base from pulp and paper industry effluents. In Chiang U.S. Pat. No. 4,731,173 entitled "Article for Constructing an Electrolytic Cell", the use of a weak permselective membrane is described for use in an electrolytic cell for the manufacture of hydrogen peroxide. This membrane is described as a low density polyethylene base film grafted to a weak base cation monomer. It is further described in Chiang as having a small mean pore size making it permeable to ions and not molecules, but having openings of sufficient size to permit the passage of gas bubbles without permitting substantial diffusion or back mixing of hydrogen peroxide from one compartment of the electrolytic cell to another.

There is no suggestion in any of these prior art references of a process to separate an hydroxyl ion from a perhydroxyl ion so as to reduce the alkalinity of the alkaline hydrogen peroxide product of an electrolytic cell.

SUMMARY OF THE INVENTION

There are disclosed processes and apparatuses for dialysis and electrodialysis for reducing the alkalinity of an electrochemically generated, alkaline hydrogen peroxide. Also disclosed is a process for reducing the alkalinity of an electrochemically generated alkaline solution of hydrogen peroxide by partially neutralizing an alkaline hydrogen peroxide aqueous composition with an acid. In the partial neutralization process, the alkalinity of an alkaline solution of hydrogen peroxide is reduced while substantially avoiding the decomposition of hydrogen peroxide by the use of a stabilizing agent.

The dialysis and electrodialysis process of the invention can be utilized in combination with an electrochemical process for the production of an alkaline hydrogen peroxide. The process can be continuous. The dialysis process and electrodialysis process of the invention can also be utilized in conjunction with a conventional hydrogen peroxide bleaching process, as utilized in a wood pulp mill. Thus, the by-product dilute alkaline solution, of the dialysis or electrodialysis process of the invention, for instance aqueous sodium hydroxide, can be cycled to the bleach liquor make-up area of a pulp mill. This waste stream can be used instead of water as diluent to make up the bleach liquor.

DETAILED DESCRIPTION OF THE INVENTION

The electrodialysis process of the invention can be conducted in an electrodialysis cell having at least three compartments separated by alternating anionic and cationic permselective cell membranes and at least an anode and a cathode. In the electrodialysis cell illustrated in FIG. 1, the hydroxyl and perhydroxyl ions present in a solution of an alkali metal hydroxide and an alkali metal hydroperoxide can be separated under the influence of a direct current potential passed through the cell between an anode and a cathode of the cell. The positively charged alkali metal ion is rejected by the anionic permselective membrane through which passes the negatively charged hydroxyl ion. The negatively charged perhydroxyl ion does not pass through the membrane as readily as the hydroxyl ion because of the greater size and lower mobility of the perhydroxyl ions, as compared to the hydroxyl ions. Accordingly, a first aqueous solution can be recovered from said cell containing an enriched perhydroxyl ion content and a decreased hydroxyl ion content and a second aqueous solution can be recovered containing an enriched hydroxyl ion content.

Figure 1:
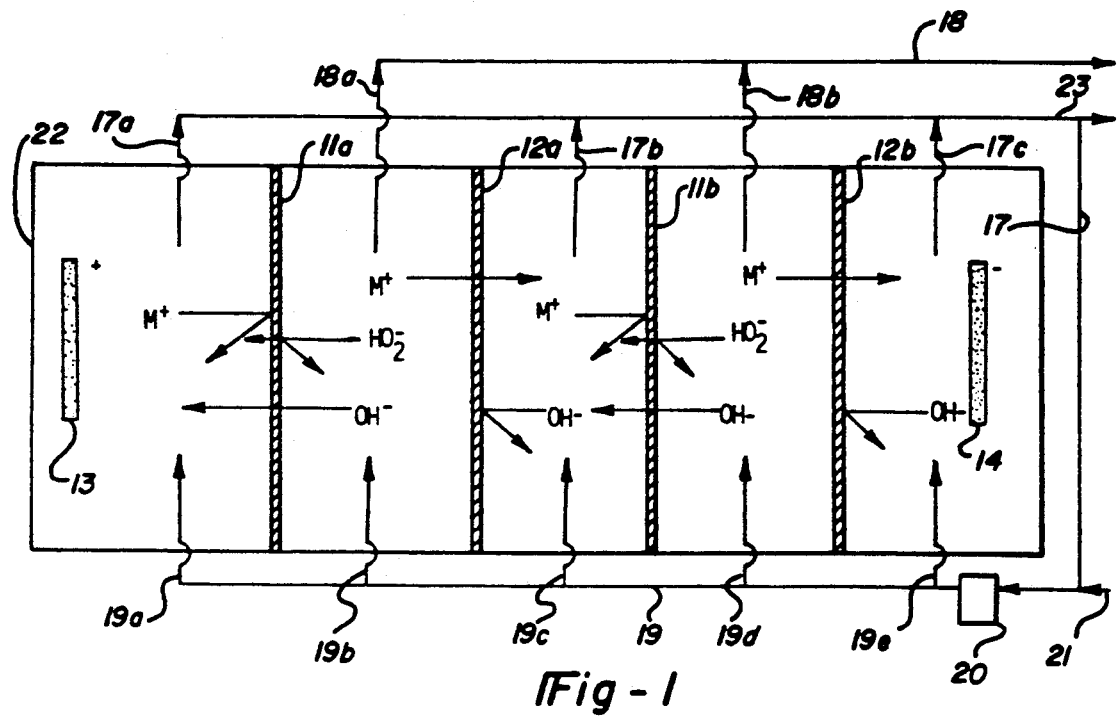
FIG. 1 schematically illustrates the ion transport according to the invention in an electrodialysis cell.

As shown diagramatically in FIG. 1, one embodiment of the electrodialysis cell of the invention contains at least three cell compartments, alternating anionic and cationic permselective membranes and at least one anode and one cathode. The electrolyte used is a first aqueous, alkaline, peroxide solution comprising the alkaline hydrogen peroxide product of an electrolysis cell for the production of hydrogen peroxide. Upon imposing a direct current potential on said anode and cathode, the alternating membrane order of the electrodialysis cell of the invention results in an increase in concentration of the hydroxyl ions in alternating cells of the electrodialysis cell and, similarly an enriched concentration of perhydroxyl ions in the remaining cell compartments from which are recovered a second aqueous solution having a higher concentration of perhydroxyl ions.

More particularly, as shown in FIG. 1 in one embodiment of the electrodialysis cell of the invention, anionic permselective membranes 11$a$, and 11$b$ and cationic permselective membranes 12$a$, and 12$b$ are shown as alternating with the permselective membranes of opposite charge in said cell. In the schematic illustration of FIG. 1, the electrodialysis cell consists of a cell wall 22, anode 13, cathode 14, conduits 18$a$ and 18$b$ to remove the desired alkaline peroxide aqueous solution having reduced hydroxyl ion concentration and inlets 19$a$, 19$b$, 19$c$, 19$d$, and 19$e$ utilized in conjunction with pump 20 to feed in to each of the cell compartments recirculated electrolyte obtained at cell outlets 17$a$, 17$b$, and 17$c$. Fresh electrochemically generated alkaline peroxide aqueous solution may enter the electrodialysis cell at conduit 21. Excess alkaline peroxide aqueous solution having increased hydroxyl ion concentration may exit the electrolysis cell at conduit 23.

In operation, anionic membranes 11$a$ and 11$b$ reject passage of positively charged metallic ions while permitting the passage of negatively charged hydroxyl ions and concurrently retarding the passage of the perhydroxyl ion. The cationic permselective cell membranes 12$a$ and 12$b$ allow passage of positively charged metal ions while refusing the passage of negatively charged hydroxyl as well as perhydroxyl ions, as indicated in the schematic diagram of FIG. 1. The desired product, an alkaline peroxide solution having reduced hydroxyl content in comparison with the hydroxyl content of the solution which is produced in an electrochemical cell for the production of alkaline peroxide, is recovered through conduit 18 which is, in turn, fed by outlets 18$a$ and 18$b$.

The current passed through the electrodialysis cell is a direct current at a voltage dictated by the design and performance characteristics of the electrodialysis cell and, therefore, the amount of current passed through the cell would be readily determined by a skilled artisan and/or could be determined by routine experimentation for the production of hydrogen peroxide, said first aqueous, alkaline peroxide solution being the product of said electrolysis process. Current densities between about 48 to about 240 amps per square foot (about 51 to about 258 milliamps per square centimeter) are preferred; current densities between about 120 to about 200 amps per square foot (about 129 to about 215 milliamps per square centimeter) are most preferred. Higher or lower current densities are contemplated, however, for certain specific applications. The result of the current flow to the electrodialysis cell is the production of the desired aqueous hydrogen peroxide solution containing a lower concentration of hydroxyl ions than is obtainable by the electrochemical generation of an aqueous, alkaline, alkali metal peroxide.

It is contemplated that the electrodialysis process of the invention can be utilized in combination with known electrochemical processes for the electrolysis of an alkali metal hydroxide to produce an alkali metal peroxide. When used in conjunction with an electrolysis process for the production of hydrogen peroxide, said first aqueous, alkaline peroxide solution is the product of said electrolysis process. An alkali metal hydroxide enriched by-product, produced in the electrodialysis cell of the invention is recovered and can be cycled as electrolyte feed to the electrochemical cell for the production of hydrogen peroxide or cycled to the electrodialysis cell. When the electrodialysis process of the invention is used in combination with an electrochemical process for the production of hydrogen peroxide by the electrolysis of an alkali metal hydroxide, it is contemplated that the flow rate of the aqueous, alkali metal hydroxide out of the electrodialysis cell into the electrolysis cell would be about the same or different. If the flow rate out of the electrodialysis cell is considerably slower than the required input flow of the electrolyte for the electrochemical cell, then it may be necessary to provide an additional source of electrolyte for the electrolytic cell. Similarly, if the flow rate of the electrochemical cell product is slower than the required input flow rate for the electrodialysis cell, it is contemplated that some of the electrodialysis cell by-product may be recycled back to the electrodialysis cell. The by-product of the electrodialysis cell of the invention can also be cycled to the bleach liquor make-up stage of a pulp mill hydrogen peroxide bleaching process. Thus, allowing the use of the dilute alkaline solution by-product as a diluent in the preparation of bleach solutions instead of using water.

In another embodiment of the electrodialysis cell of the invention, electrochemically generated alkaline peroxide solution can be fed to the cell of FIG. 1 through conduits 19b and 19d. Simultaneously, dilute alkali metal hydroxide solution can be fed to the cell through conduits 19a, 19c, and 19e. An additional pump would be required in this embodiment which would provide lower overall cell voltage, since electrolyte conductivity would be higher than in the embodiment of FIG. 1.

Figure 2:
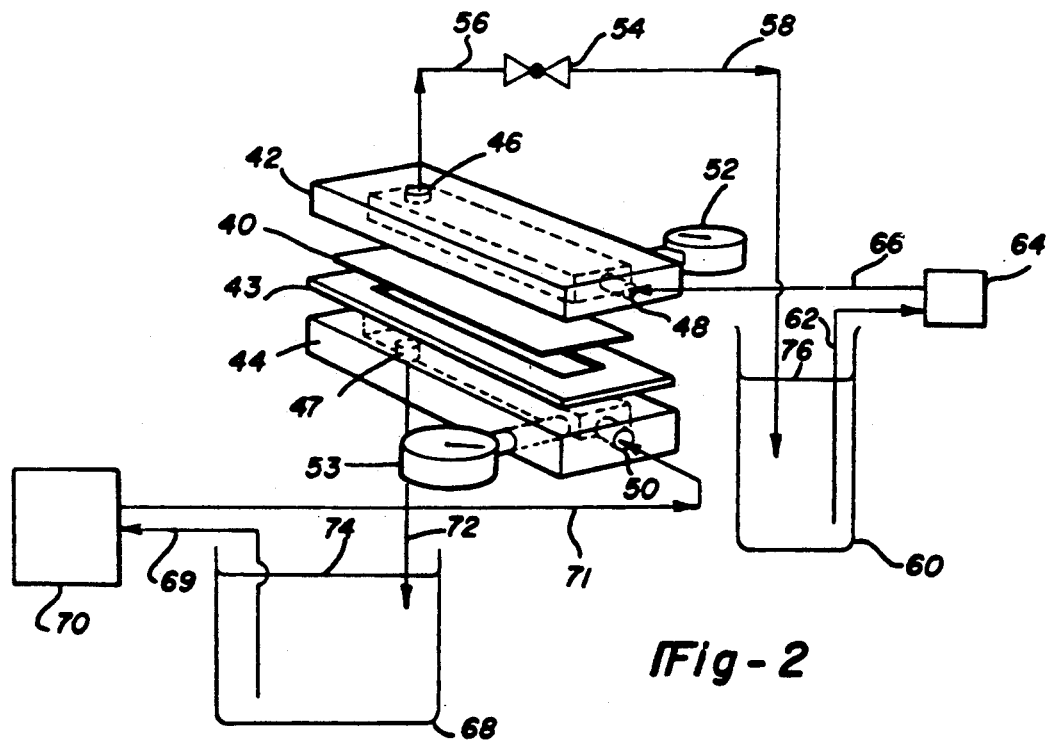
FIG. 2 diagramatically illustrates a typical dialysis cell.

In FIG. 2, there is shown diagramatically, one embodiment of a dialysis cell suitable for conducting the process of the invention. This dialysis cell may be used to reduce the concentration of aqueous, alkali metal hydroxide product of an electrolysis cell for the electrolysis of an alkali metal hydroxide to produce an alkali metal hydroperoxide. The dialysis process is conducted in a cell in which a first side of a cationic permselective membrane is contacted with a first aqueous solution of an electrochemically generated, aqueous, alkaline peroxide solution containing perhydroxyl ions and excess hydroxyl ions and a second side of said cationic permselective membrane is contacted with a second aqueous solution having an hydroxyl ion concentration less than that of said first aqueous solution or soft water. A second aqueous solution dialysate containing a lower concentration of hydroxyl ions is recovered as the desired product of the dialysis process. An hydroxyl ion enriched third aqueous solution obtained in the process is discarded or utilized in conjunction with an electrochemical cell in a process for the production of an alkaline peroxide or in conjunction with a wood pulp mill hydrogen peroxide bleach liquor preparation process in much the same manner as described above in connection with the electrodialysis process. It is considered that where the dialysis process is used in combination with a process for the production of an alkaline peroxide in an electrochemical cell, it may be necessary to cycle the aqueous, alkali metal hydroxide by-product, as electrolyte, to the electrochemical cell or the desired product of the dialysis cell may be recycled so as to further concentrate the dialysate.

More particularly, one embodiment of the dialysis cell of the invention, as shown in FIG. 2, consists of an upper compartment 42 having an inlet 48 and an outlet 46 and a pressure gage 52 connected so as to monitor the pressure of the fluid passing through that portion of the cell. Cell compartment 42 is separated from lower cell compartment 44 by a cell membrane 40 and cell membrane frame 43. Cell compartment 44 has inlet 50, outlet 47 and a pressure gage 53 is connected to cell compartment 44 so as to monitor the pressure of the liquid flowing through that portion of the cell.

In operation, the dialysis cell is fed with an aqueous, alkaline peroxide electrolyte through conduit 66, which enters inlet 48 and which is driven by pump 64 which draws liquid through conduit 62 from feed reservoir 60. The feed electrolyte is passed through cell compartment 42 and exits in outlet 46 through conduit 56 to which is attached pressure control valve 54. Thereafter, the cell feed is recirculated through conduit 58 to feed reservoir 60; the level of electrolyte in feed reservoir 60 being indicated as 76. The opposite cell compartment 44 is fed with dialysate through conduit 71 by pump 70, which draws liquid from the dialysate reservoir 68 through conduit 69; the level of dialysate in reservoir 68 being indicated by 74. The dialysate is circulated through dialysis cell compartment 44 concurrently with the electrolyte feed, entering through inlet 50 and exiting through outlet 47 and returned to dialysate reservoir 68 through conduit 53.

The aqueous, alkali metal hydroperoxide feed or starting solution used in either the neutralization, electrodialysis, or dialysis process of the invention is, preferably, one containing sodium hydroxide and sodium hydroperoxide or potassium hydroxide and potassium hydroperoxide, but the solution may also contain other alkali metal hydroxides and hydroperoxides.

The concentration of the alkali metal hydroxide and the alkali metal hydroperoxide in the feed solution to the electrodialysis or dialysis cells used in the processes of the invention generally, is about 1.5 to about 15 wt. percent alkali metal hydroxide and about 1 to about 10 wt. percent alkali metal hydroperoxide. Preferably, the feed solution to the cells is, respectively, between about 2.5 to about 10 wt. percent and about 2 to about 8 wt. percent, and most preferably is, respectively, about 3 to about 6 wt. percent and about 2.5 to about 4.5 wt. percent.

Generally, the feed solution to the electrodialysis and dialysis cells is provided substantially free of other cations than those referred to above. For instance, the feed solution is free of substantial amounts of calcium, magnesium, iron (ferric) or iron (ferrous) ions. These ions, when present, can migrate across the cation permselective membrane and precipitate or foul the permselective membrane.

The result of the operation of the dialysis cell of the invention and current flow in the electrodialysis cell of the invention is to produce a product solution of alkali metal hydroperoxide having a weight ratio of total alkalinity to hydrogen peroxide, generally, of about 0.5:1 to about 1.2:1. Preferably, said weight ratio is about 0.7:1 to about 1.1:1, and most preferably, about 0.8:1 to about 1.0:1.

The concentration of the alkali metal hydroxide which is withdrawn from the electrodialysis cell of the invention is greater than that concentration of alkali metal hydroxide which is fed into the cell, and generally, is about 2 to about 20%, preferably, about 3 to about 15%, and most preferably, about 4 to about 10%, all by weight.

The anion and cation permselective membranes useful in the electrodialysis cell of one embodiment of the invention are characterized as strongly anion or cation permselective. Particularly useful anion permselective membranes are available from Asahi Glass Company under the tradename FLEMION or from Ionics, Inc. For instance, those membranes sold under the tradename IONICS 104-UZL-386 or Sybron Chemical Inc. type MA-3475 are useful. Cationic exchange permselective membranes can be obtained from DuPont and are sold under the tradename NAFION®, for instance, NAFION 427.

The cationic permselective membranes utilized in the dialysis cells for conducting the dialysis process of the invention must exhibit a marked specificity for the diffusion of anions and a strong preference for the diffusion of an alkali metal ion, for example, the sodium ion. Generally, useful dialysis membranes are characterized as weakly cationic and are prepared by the incorporation of moderately dispersed, negatively charged ion clusters within the membrane material or on the surfaces thereof. These ion clusters facilitate alkali metal ion transport by recognized ion exchange mechanisms. Because the ion clusters are widely dispersed, some anion transport through the membrane occurs allowing transport during dialysis through the membrane of the highly mobile, relatively small size, hydroxyl ion. The transport through the membrane of the larger size and less mobile perhydroxyl ion or other larger multivalent anions which may be present is restricted by such a membrane. The separation efficiency of such a dialysis membrane can be regulated by changing the concentration of the ion clusters within the membrane or by moderating the hydrophilicity of the membrane or, alternatively, providing a membrane having cross linked polymer chains of ion clusters. An example of a suitable dialysis membrane is a commercial membrane marketed under the trade name Raipore BDM-10, sold by the RAI Research Corporation. This ion exchange membrane comprises a grafted low density polyolefin base film, for example, a polyethylene base film having a weak base cationic monomer as the graft polymer forming the ion clusters which provide the alkali metal ion transport through the membrane. This membrane is disclosed as suitable for use in an alkaline environment containing an alkaline solution of perhydroxyl ion in U.S. Pat. No. 4,731,173 and U.S. 4,758,317. In U.S. Pat. No. 4,230,549 (incorporated herein by reference) a process is disclosed for the preparation of this type of membrane.

In another process of the invention, the excess alkalinity of an aqueous, alkaline peroxide produced in an electrochemical cell can be reduced by partial neutralization with a dilute solution of an acid. In order to obtain the desired total alkalinity to peroxide ratio which makes alkaline peroxide aqueous solutions suitable for use in the woodpulp industry, the typical total alkalinity to hydrogen peroxide weight ratio of about 2:1 to about 1.7:1 of the starting solution must be reduced by partial neutralization. It is common for electrochemical cells for the production of alkaline hydrogen peroxide to produce an alkaline peroxide aqueous solution having an alkalinity to peroxide weight ratio of about 1.5:1 to about 1.9:1. The desired total alkalinity to peroxide weight ratio is generally about 0.6:1 to about 1.3:1, preferably, about 0.8:1 to about 1.2:1, and most preferably, about 0.9:1 to about 1.1:1.

Simply mixing an acid with the aqueous, alkaline peroxide solution is ineffective in obtaining the desired result, since the neutralization process and the resulting elevated temperature of the aqueous solution tends to destabilize the hydrogen peroxide and produce a peroxide decomposition rate which is excessive. Surprisingly, it has been found that a stabilizer can be added to the aqueous, alkaline hydrogen peroxide solution prior to the addition of an acid solution so that upon acid addition the decomposition rate is reduced over that which occurs without stabilizer present. Generally, the decomposition rate is reduced from about 5 to about 15 to about 0.1 to about 1.0 grams per liter per day, preferably about 0.2 to about 0.8, and most preferably, about 0.3 to about 0.6 grams per liter per day. Representative acids, diluted solutions of which are suitable for use in the process of the invention are as follows: sulfuric acid, hydrochloric acid, phosphoric acid, nitric acid, acetic acid, and mixtures thereof.

Representative alkaline earth metal salts which are useful as stabilizers against peroxide decomposition are as follows: magnesium sulfate, calcium chloride, barium chloride, magnesium silicate, and strontium nitrate, or mixtures thereof. For instance, the presence of about 0.001M to about 0.006 M, preferably, about 0.0015M to about 0.0025M magnesium sulfate as a stabilizer in the hydrogen peroxide solution adequately protects the hydrogen peroxide solution against decomposition at an excessive rate upon the subsequent addition of a partially neutralizing amount of a dilute solution of sulfuric acid. Generally, the acid, i.e., sulphuric acid, is added in an amount sufficient to reduce the alkalinity to the desired level. Both dilute and concentrated solutions of acid may be used. For instance, 5% to 98% by weight solutions of sulfuric acid may be used, preferably, about 20% to about 40% by weight, most preferably, about 25% to about 35% by weight of acid solution can be used.

The following examples illustrate the various aspects of the invention. Where not otherwise specified throughout this specification and claims, temperatures are given in degrees centigrade and parts, percentages, and proportions, are by weight.

EXAMPLE 1

An electrodialysis cell similar to that shown in FIG. 1 was used to demonstrate reduction of the alkalinity in an aqueous, alkaline hydrogen peroxide solution having various total initial alkalinity to hydrogen peroxide feed weight ratios, as indicated in the following table. In this example, the anion exchange permselective membrane utilized was produced by Sybron Chemical Co., Inc. and was sold under the designation MA-3475. The cation permselective ion exchange membrane was sold under the trade name NAFION 427 by DuPont. Upon operating the cell at the current and voltage listed in the following table and utilizing the listed feed of sodium hydroxide and hydrogen peroxide amounts, which calculate to the weight ratios shown in the table, the final concentrations of sodium hydroxide and hydrogen peroxide produced results in a substantially reduced alkalinity ratio over the initial alkalinity ratio utilized in the cell feed solution.

TABLE I

| Current (amps.) | Voltage (Volts) | NaOH feed (gpl) | $H_2O_2$ Feed (gpl) | Alkalinity Ratio Feed | NaOH Prod. | $H_2O_2$ Prod. | Alkalinity Ratio Prod. |
|---|---|---|---|---|---|---|---|
| 8.5 | 15.1 | 56.4 | 27.6 | 2.05:1 | 37.2 | 22.8 | 1.63:1 |
| 10.0 | 17.1 | 56.0 | 26.9 | 2.08:1 | 32.2 | 16.6 | 1.88:1 |
| 10.0 | 17.4 | 54.4 | 31.0 | 1.76:1 | 33.6 | 22.4 | 1.50:1 |
| 10.0 | 17.4 | 55.0 | 29.8 | 1.85:1 | 26.0 | 18.9 | 1.38:1 |

EXAMPLE 2

A dialysis cell, similar to that illustrated in FIG. 2, was utilized to demonstrate the reduction of the alkalinity of an aqueous alkaline hydrogen peroxide solution having a total alkalinity to hydrogen peroxide weight ratio of about 1.7:1 and utilizing as the dialysis membrane a 2 mil. thick film of a polyolefin base film sold under the trade name RAIPORE BDM-10 by RAI Research Corporation. A weak base cationic monomer is grafted to said polyolefin base film in the preparation of said membrane. Aqueous, alkaline peroxide was fed to the dialysis cell at a temperature of 24 degrees centigrade at a rate of 136 milliliters per minute. The feed reservoir volume was 0.270 liters. The dialysate reservoir volume was 4.0 liters. The dialysis flow rate was 170 milliters per minute. The results of this experiment show that the alkalinity to peroxide weight ratio can be reduced from a starting ratio, by weight, of 1.69:1 to 1.48:1 subsequent to dialysis. The results obtained are further described in Table II.

TABLE II

| Time after Dial. Start (min.) | [NaOH] (gpl) | [$H_2O_2$] (gpl) | Alkalinity Ratio Feed | Conc. Gradient free NaOH only (gpl) |
|---|---|---|---|---|
| 0 | 88.4 | 52.18 | 1.69:1 | 27.01 |
| +16 | 85.04 | 50.23 | 1.69:1 | 25.72 |
| +29 | 80.80 | 48.82 | 1.66:1 | 22.85 |
| +43 | 78.0 | 47.88 | 1.63:1 | 20.97 |
| +63 | 74.4 | 46.03 | 1.62:1 | 19.30 |
| +80 | 71.2 | 44.74 | 1.59:1 | 17.40 |
| +96 | 67.8 | 43.29 | 1.57:1 | 15.48 |
| +112 | 65.0 | 42.18 | 1.55:1 | 13.80 |
| +143 | 61.20 | 39.72 | 1.54:1 | 12.63 |
| +161 | 58.36 | 38.49 | 1.52:1 | 11.05 |
| +177 | 55.20 | 37.08 | 1.49:1 | 9.34 |
| +196 | 53.20 | 35.86 | 1.48:1 | 8.64 |

EXAMPLE 3

In order to illustrate the importance of having a peroxide decomposition rate stabilizer present prior to partial acid neutralization of the alkalinity of an aqueous alkaline solution of hydrogen peroxide, 0.024% by weight of magnesium sulfate was added to a hydrogen peroxide aqueous solution having an alkalinity to peroxide weight ratio of about 1.7:1. The alkalinity to peroxide weight ratio was reduced by partial neutralization to about 0.67:1 by the addition of a partially neutralizing amount of 6 Normal sulfuric acid. Both reagent grade concentrated sulfuric acid and technical grade concentrated sulfuric acid were utilized. The use of technical grade sulfuric acid provided a slightly greater destabilizing effect than reagent grade sulfuric acid.

Partial neutralization of a hydrogen peroxide aqueous solution having an alkalinity to peroxide weight ratio of about 1.7:1 by the addition of 6 Normal, technical grade sulfuric acid caused a temperature rise of between 25 to 35 degrees centigrade. The aqueous, alkaline hydrogen peroxide composition subsequent to acid addition, as above, was essentially stable in comparison with a similar neutralization experiment in which no stabilizer was present, as described in control Examples 4 and 5. A peroxide decomposition rate of approximately 0.6 grams per liter per day was obtained by the partial neutralization process of the invention.

EXAMPLES 4 AND 5

Controls Forming No Part of This Invention

Example 3 was repeated using both reagent grade and technical grade concentrated sulfuric acid to partially neutralize (alkalinity to peroxide weight ratio of 0.67:1) an aqueous, alkaline solution of hydrogen peroxide having an initial alkalinity to peroxide ratio of about 1.7:1, as described in Example 3. No magnesium sulfate was added as stabilizer prior to neutralization. The addition of concentrated technical or reagent grade sulfuric acid caused a temperature rise in the alkaline peroxide solution of 25 to 44 degrees centigrade and also caused the peroxide solution to become cloudy and unstable, i.e., greater than about 15 g per liter per day peroxide decomposition rate.

Example 3 was repeated using sulfuric acid diluted to a concentration of 6 Normal (25% by weight) utilizing both reagent grade and technical grade sulfuric acid but without the use of magnesium sulphate as stabilizer. Upon partial neutralization using either grade of sulfuric acid (alkalinity to peroxide weight ratio of 0.67:1), a 25 to 32 degrees centigrade temperature rise was produced and the solution of alkaline hydrogen peroxide became unstable to the extent indicated above.

While this invention has been described with reference to certain specific embodiments, it will be recognized by those skilled in the art that many variations are possible without departing from the scope and spirit of the invention. It will be understood that it is intended to cover all changes and modifications of the invention disclosed for the purposes of illustration, which do not constitute departures from the spirit and scope of the invention.

The embodiments of the invention in which an exclusive property or privilege is claimed are defined as follows:

1. A dialysis process for reducing the concentration of hydroxyl ions in an electrochemically generated, aqueous solution of hydroxyl and perhydroxyl ions comprising:
   (A) contacting in a dialysis cell a first side of a cationic permselective membrane with a first aqueous, feed solution containing perhydroxyl ions and excess hydroxyl ions;
   (B) contacting a second side of said cationic permselective membrane with an aqueous solution less concentrated with respect to hydroxyl ion than said first aqueous solution; and
   (C) recovering a second aqueous product solution containing hydroxyl and perhydroxyl ions at a lower concentration of hydroxyl ions than said first aqueous, feed solution.

2. The process of claim 1, wherein said first aqueous, feed solution is an alkaline peroxide solution having about 1.5 to about 15 weight percent alkali metal hydroxide and about 1 to about 10 weight percent alkali metal hydroperoxide, and said cationic permselective membrane comprises a polyolefin base film having grafted thereto a weak base cationic monomer.

3. The process of claim 2, wherein said second aqueous, product solution has a total alkalinity to peroxide weight ratio of about 0.5:1 to about 1.2:1 and wherein a third aqueous solution comprising hydroxyl ions is recovered and cycled to at least one of:
   (A) an electrochemical cell for the production of an alkaline peroxide, or
   (B) the bleach liquor make up stage of a wood pulp mill bleaching system using hydrogen peroxide as bleach.

4. The process of claim 3, wherein said feed solution comprises sodium or potassium hydroxide and said product solution comprises, respectively, sodium or potassium hydroperoxide.

5. An electrodialysis process for reducing the concentration of base in an electrochemically generated, aqueous, alkaline peroxide solution, said process comprising:
   (A) contacting a first aqueous, alkaline peroxide feed solution comprising hydroxyl and perhydroxyl ions in an electrodialysis cell comprising at least one anode and one cathode and at least three cell compartments separated by permselective membranes present as alternating anionic and cationic membranes,
   (B) imposing a direct current potential on said electrodes,
   (C) recovering a second aqueous, alkaline peroxide product solution having a lower weight ratio of base to hydrogen peroxide than said first aqueous, alkaline peroxide feed solution from the cell compartments containing an enriched perhydroxyl ion aqueous solution and
   (D) producing an hydroxyl ion enriched first aqueous, alkaline peroxide solution in the remaining cell compartments.

6. The process of claim 5, wherein said electrodialysis cell is utilized in combination with an electrochemical cell for the production of hydrogen peroxide, wherein said first aqueous, feed solution is obtained from said electrochemical cell and comprises a solution of alkaline peroxide having about 1.5 to about 15 weight percent alkali metal hydroxide and about 1 to about 10 weight percent alkali metal hydroperoxide and wherein said hydroxyl ion enriched first aqueous, alkaline peroxide solution obtained from said electrodialysis cell is recovered and cycled to at least one of:
   (A) said electrochemical cell,
   (B) said electrodialysis cell, or
   (C) the bleach liquor make up stage of a wood pulp bleaching process.

7. The process of claim 6 wherein said feed solution comprises sodium or potassium hydroxide and said second aqueous product solution comprises, respectively, sodium or potassium hydroperoxide.

8. A dialysis cell for reducing the concentration of hydroxyl ions in an aqueous solution of hydroxyl and perhydroxyl ions consisting of a first and second cell compartment separated by a polyolefin base film membrane having grafted thereto a weak base cationic monomer.

9. An apparatus for conducting a batch or continuous process comprising a combination of a dialysis cell and an electrochemical cell for the production of an alkaline peroxide, said combination comprising:
   (A) a dialysis cell for reducing the concentration of hydroxyl ions in an aqueous solution of hydroxyl and perhydroxyl ions, said dialysis cell having a first and second cell compartment separated by a polyolefin base film membrane having grafted thereto a weak base cationic monomer and
   (B) an electrochemical cell for the production of an alkaline peroxide comprising an electrochemical cell having at least two cell compartments containing at least one anode and one cathode separated by a cell membrane, and
   (C) means for feeding an aqueous, alkaline peroxide solution generated in said electrochemical cell to the cell compartments of the dialysis cell.

10. An apparatus for conducting a batch or continuous process comprising a combination of a dialysis cell and the bleach liquor make up equipment of a wood pulp mill, said combination comprising:
   (A) a dialysis cell having first and second compartments separated by a polyolefin base film cell membrane having grafted thereto a weak base cationic monomer and
   (B) the bleach liquor make up equipment of a wood pulp mill bleaching system, and
   (C) means for feeding the dialysis cell waste stream obtained in a waste water compartment of the dialysis cell to the bleach liquor make up stage of a wood pulp mill bleaching system.

11. An apparatus for conducting a batch or continuous process comprising a combination of a dialysis cell, an electrochemical cell for the production of an alkaline peroxide, and the bleach liquor make up equipment of a wood pulp mill, said combination comprising:
   (A) a dialysis cell for reducing the concentration of hydroxyl ions in an aqueous solution of hydroxyl and perhydroxyl ions, said dialysis cell having first and second compartments separated by a polyolefin base film cell membrane having grafted thereto a weak base cationic monomer, (B) an electrochemical cell having at least an anode and a cathode compartment containing an anode and a cathode separated by a cell membrane, (C) means for feeding a waste stream effluent of the dialysis cell to the bleach liquor make up equipment of said wood pulp mill, and (D) means for feeding an aqueous, alkaline peroxide solution generated in said electrochemical cell to the cell compartments of the dialysis cell.

12. An apparatus for conducting a batch or continuous process comprising a combination of an electrodialysis cell and an electrochemical cell for the production of an alkaline peroxide comprising:

(A) an electrodialysis cell having at least one anode and one cathode separated by at least two alternating anionic and cationic permselective membranes forming at least three cell compartments, wherein said anode is adjacent to one of said anionic membranes and said cathode is adjacent to one of said cationic membranes, (B) an electrochemical cell having at least one anode and one cathode separated by a cell membrane, (C) means for feeding an electrochemically generated, aqueous, alkaline peroxide solution to the cell compartments of the electrodialysis cell, (D) means for recovering an alkaline peroxide, aqueous solution, which is reduced in alkalinity in said electrodialysis cell, and (E) means for cycling an aqueous, alkaline solution by-product of said electrodialysis cell to said electrochemical cell as electrolyte.

13. An apparatus for conducting a batch or continuous process, said apparatus comprising:

(A) an electrodialysis cell having at least one anode and cathode separated by alternating anionic and cationic permselective membranes and forming thereby at least three cell compartments, and wherein said anode is adjacent to one of said anionic membranes and said cathode is adjacent to one of said cationic membranes, (B) an electrochemical cell for the production of an alkaline peroxide, said cell having at least one anode and one cathode separated by a cell membrane, (C) the bleach liquor make up equipment of a wood pulp mill bleaching system, (D) means for cycling an aqueous alkaline peroxide product of said electrochemical cell to said electrodialysis cell as cell electrolyte, (E) means for recovering from said electrodialysis cell a cell product comprising an alkaline peroxide having reduced alkalinity, (F) means for recovering from said electrodialysis cell a by-product comprising an aqueous electrolyte solution having increased alkalinity and reduced peroxide content in comparison with an electrolyte product of said electrochemical cell, (G) means for recovering an alkaline peroxide product of the electrodialysis cell, and (H) means for cycling an alkaline solution by-product of the electrodialysis cell
  (1) to the electrochemical cell as electrolyte or
  (2) to the bleach liquor make up equipment of a wood pulp mill bleaching system using hydrogen peroxide as bleach.

* * * * *